356-400

1/6/81 XR 4,243,925

United States Patent [19]

Gnuechtel

[11] 4,243,925

[45] Jan. 6, 1981

[54] REGISTER CONTROL SYSTEM FOR WEB OPERATING APPARATUS

[75] Inventor: Herman C. Gnuechtel, Chicago, Ill.

[73] Assignee: Web Printing Controls Co., Inc., Bensenville, Ill.

[21] Appl. No.: 946,380

[22] Filed: Sep. 27, 1978

[51] Int. Cl.[3] .............. G05B 19/29

[52] U.S. Cl. .............. 318/603; 318/640; 318/624; 356/400; 250/548; 250/557; 250/561; 250/571

[58] Field of Search .............. 318/603, 640, 624, 685; 250/548, 557, 561, 571; 356/400, 375

[56] References Cited

U.S. PATENT DOCUMENTS

| | | | |
|---|---|---|---|
| 3,693,099 | 9/1972 | Oberst | 318/624 |
| 3,783,293 | 1/1974 | Gold et al. | 250/548 |
| 3,870,936 | 3/1975 | Coberley | 318/603 |
| 4,067,760 | 1/1978 | Nelson | 250/548 |

FOREIGN PATENT DOCUMENTS

| | | | |
|---|---|---|---|
| 1038772 | 10/1953 | France | 250/561 |
| 1041265 | 9/1966 | United Kingdom | 250/561 |

*Primary Examiner*—Gene Z. Rubinson
*Assistant Examiner*—Eugene S. Indyk
*Attorney, Agent, or Firm*—Fitch, Even, Tabin, Flannery & Welsh

[57] ABSTRACT

A control system is disclosed for acquiring and maintaining a register condition for successive repeat lengths of a moving web relative to a cut-off apparatus or the like in a web operating apparatus of the type which includes an adjustment means for advancing or retarding the web relative to the cut-off apparatus. The system operates in manual and automatic modes and while in the manual mode, an operator manipulates the adjustment means to obtain the register condition and then switches to the automatic mode which maintains the register condition. The system includes a scanner for detecting indicia and producing a mark signal, and encoder connected to the cut-off apparatus for producing a number of pulses per revolution in either rotational direction and an indication of the direction of rotation, a counter for maintaining a count of the pulses and having a terminal count corresponding to the number of pulses generated by the encoder per revolution, means for detecting the occurrence of the mark signal relative to the terminal count of the counter and generating an error signal, drive means responsive to the error signals for driving the adjusting equipment to reacquire the register condition. After the register condition is obtained during set up in manual mode, switching to automatic mode causes the first mark signal to enable the counter which is thereafter reset whenever its terminal count is reached.

20 Claims, 11 Drawing Figures

REGISTER CONTROL SYSTEM FOR WEB OPERATING APPARATUS

This invention generally relates to register control systems, and more particularly relates to a system and method for acquiring and maintaining a register condition in a web operating apparatus of the type which has a work applying means acting on the web at successive repeat lengths during movement thereof and which has a web adjusting means for advancing or retarding the position of the repeat lengths relative to the work applying means.

Register control systems have been used for many years for the purpose of automatically presenting a web, such as paper in a printing press or the like to a work applying means which may comprise a pair of cutting rolls that cut the paper at the proper location. Once the apparatus has been set up by the operator to cut the web at the proper location (the register condition), which occurs at each of successive repeat lengths of the webs, the control system usually varies an upstream adjusting means which is usually in the form of a compensator roller which can be moved in a manner whereby the web location where the cut is to occur can be advanced or retarded so that the register condition can be maintained. The systems generally employ a scanner which detects one or more dark lines or other indicia on the web which occurs one or more times during each repeat length or signature, as well as an encoding generator which is operably connected to one of the cutting rolls of the work applying means so that it generates tach pulse for each revolution of the cutter (often referred to as the "once-around" tach pulse) and then compares the relative occurrence of the tach pulse with the occurrence of the mark signal that is derived from the scanner to determine if the position of the web as it is presented to the cutter has moved relative to its register or proper position.

Most prior art systems have employed an encoder to produce the "once-around" pulse which, after the registered condition has been acquired during set up, must be adjusted to occur at the proper location for comparison with the mark signal that is produced by the scanner detecting the mark from the web. The encoders that have been utilized in many prior art systems have employed various techniques to properly position the encoder so that the one or more pulses occur at the proper time and have employed structural adjustment techniques to properly position the components which detect the pulses within the encoder. For example, a magnet which results in the generation of the once-around tach signal for each revolution of the encoder shaft has been physically repositioned to provide the signal at the proper rotational position. Other systems have required movement of light sources and photo receivers therein as well as rotating the commutator thereof. Purportedly improved devices have employed fiber optic cables to fixed sources and receivers with the fiber optic cables being capable of being repositioned. Virtually all of these techniques are intended to generate a once-around tach pulse, i.e., one pulse for each revolution of the encoder wherein the pulse occurs at the same time as the mark signal is generated by the scanner so that when the encoder is set up whereby there is no difference between the occurrence of the mark signal and the tach pulse, any subsequent advancement or retardation of the web during operation position will result in a difference between the occurrence of these two signals which can be used to make a correction. Systems have been used which generate a few thousand pulses per revolution in addition to the once-around pulse, but the greater number of pulses are used only to determine the magnitude of the error between the occurrence of the mark signal and the once-around tach signal.

Unlike the foregoing systems which employ the often cumbersome and complex encoder reference generators which must be manipulated during the setting up of the apparatus, the present invention represents a radical departure from the prior art in that it does not utilize the once-around tach signal and therefore does not suffer from the many problems that are experienced by its use, including the necessity of employing manipulation of the encoding reference generator itself.

Accordingly, it is an object of the present invention to provide an improved register control system and method which represents a significant improvement over prior art register control systems and which does not experience the many problems of those systems.

Another general object of the present invention is to provide a system that is operable in manual and automatic modes, wherein the register condition is set up while in manual mode and, upon switching to the automatic mode, automatically maintains the register condition without any manipulation or adjustment of the encoding reference generator.

Another object of the present invention is to provide a register control system and method which, by virtue of its unique design, employs a conventional encoding reference generator which merely produces a predetermined number of pulses together with an indication of the direction of rotation of the encoder shaft which is used in the system.

Yet another object of the present invention is to provide a register control system which employs a scanner for automatically producing mark signals that are reliable and unambiguous in that they have been examined and determined to have the necessary sharpness in terms of change in contrast, are properly isolated from other possible mark signals and are preceded by a sufficient amount of light area, so that the subsequent increasing of the web speed will not result in the loss of a mark signal.

Still another object of the present invention is to provide a register control system which automatically selects an unambiguous and distinctive mark signal during scanning of the web during set up and employs a counter having a terminal count corresponding to the number of pulses produced by the encoding reference generator during each revolution, so that upon switching to automatic mode, the first occurrence of a mark signal enables the counter so that the system can then merely measure the relative occurrence of the mark signal with the terminal count during subsequent running and generate an error signal in the event the mark signal and the terminal count do not coincide.

An ancillary object to the foregoing object lies in the provision of having the counter decremented in the event the pulse generating shaft rotates in the opposite direction such as may occur if the web operating apparatus is stopped so that the running count of the counter will be continuously indicative of the precise angular position of the encoder shaft after initial set up, although it is unimportant where the position of the shaft was when the first mark signal occurred which enabled the counter.

Still another object of the present invention lies in the provision of using an alternating current stepping motor to drive the web adjusting means, wherein the error signal which is digital, will result in uniform movement of the adjusting means, regardless of the loading that occurs on the stepping motor.

Still another ancillary object of the present invention lies in the provision of adjustably correlating the length of time the stepping motor operates per count of the error count, to thereby adapt the system to differing types of adjusting means of web operating apparatus.

Yet another detailed object of the present invention lies in the provision of being able to incrementally advance or retard the position of the web during automatic operation, without stopping the web and again setting up the system in the event the web slips during operation of the web operating apparatus.

Other objects and advantages will become apparent upon reading the following detailed description, together with the attached drawings, in which.

Figure 2:
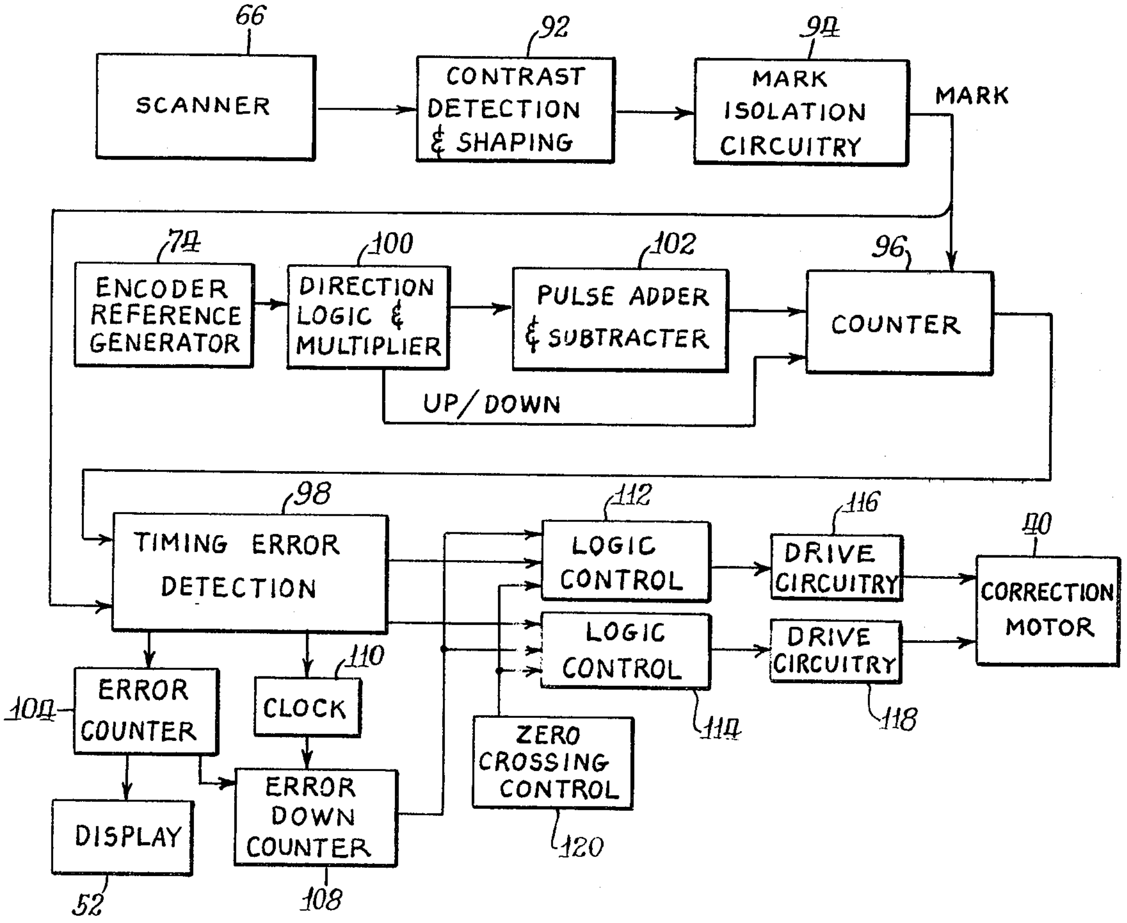
FIG. 2 is a block diagram of the electrical circuitry of the control system embodying the present invention.
Figure 8:
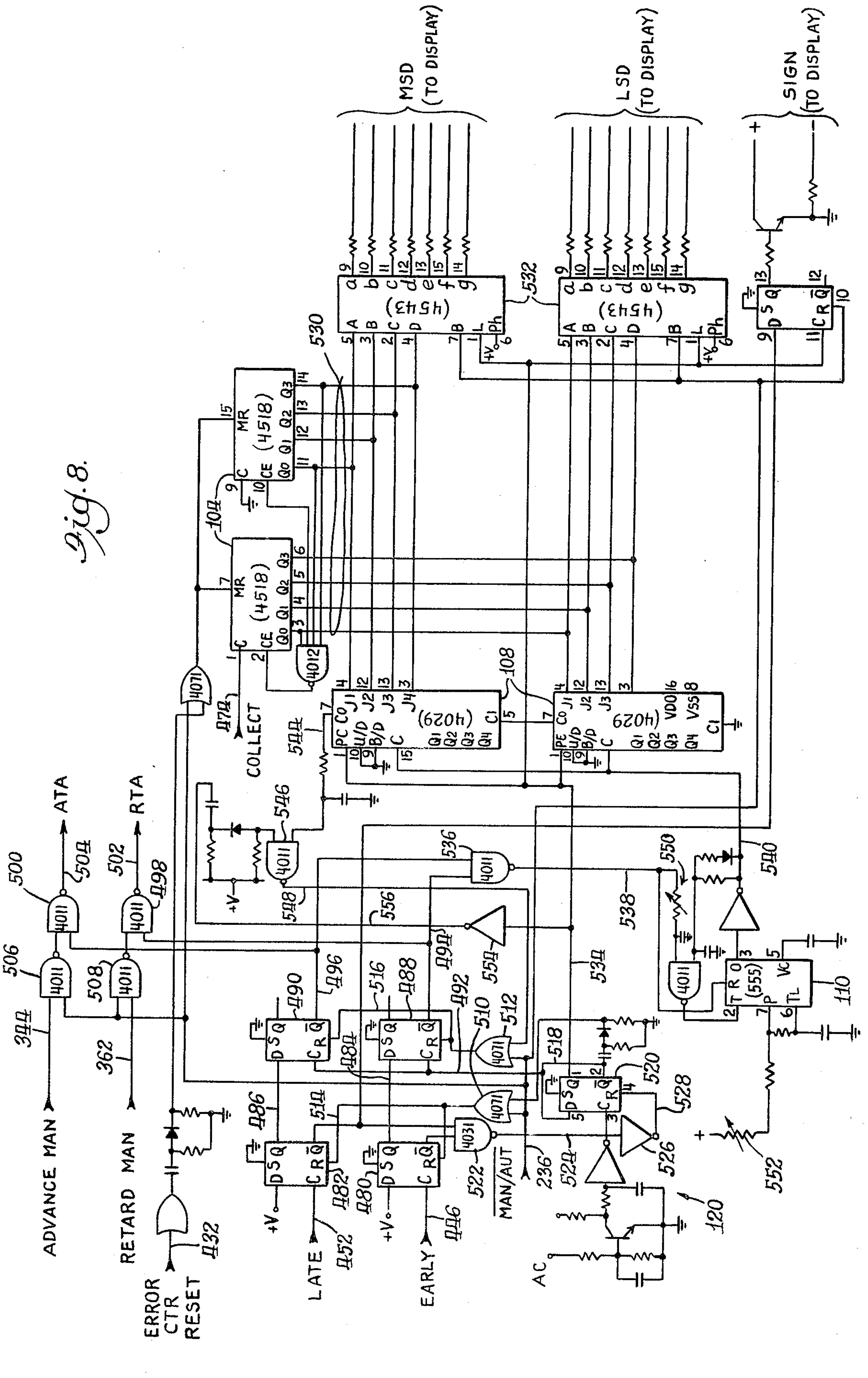
Figure 9:
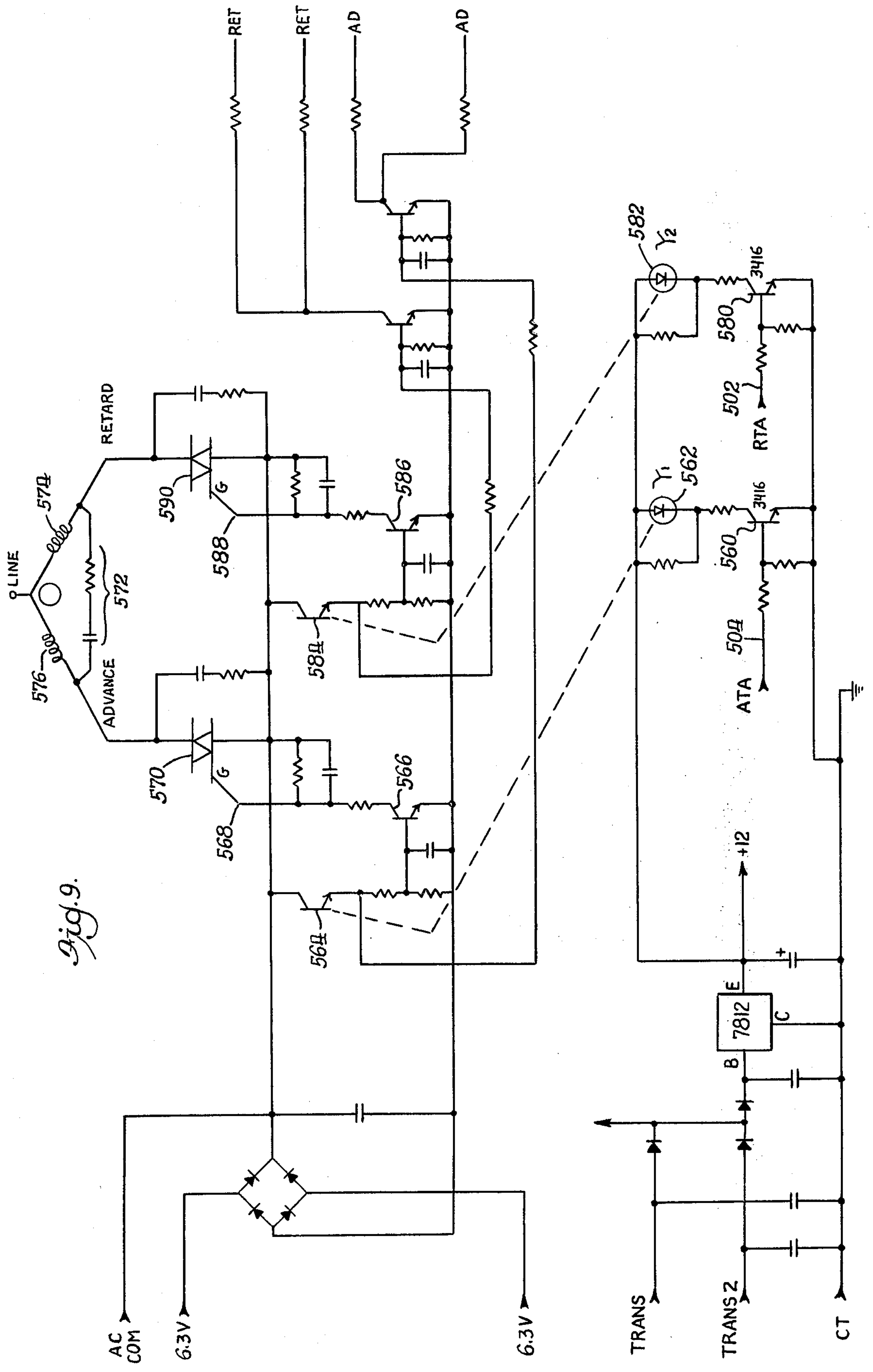

FIGS. *6a* and *6b* together comprise an electrical schematic circuit diagram of a portion of specific circuitry that can be used to carry out a portion of the operation of the block diagram shown in FIG. 2, and specifically including the circuitry used in generating the mark signals, the circuitry used in processing the signals from the encoding reference generator and the circuitry used to effect advancing and retarding the web in the manual and automatic modes of operation;

FIGS. *7a* and *7b* together comprise an electrical schematic circuit diagram of specific circuitry that can be used to carry out a portion of the operation of the circuitry shown in the block diagram of FIG. 2, and specifically illustrating the counter circuitry that receives the encoding reference generator pulses, and the circuitry that produces the error signals;

FIG. 8 illustrates an electrical schematic circuit diagram of specific circuitry that can be used to carry out the operation of a portion of the circuitry shown in the block diagram of FIG. 2, and specifically including the circuitry which receives the error signals, provides digital display and controls the energization of the compensating motor which drives the web adjusting means; and, FIG. 9 is an electrical schematic circuit diagram of specific circuitry that can be used to carry out the operation of a portion of the circuitry shown in the block diagram of FIG. 2, and more specifically illustrates circuitry for driving the correction motor.

Figure 1:
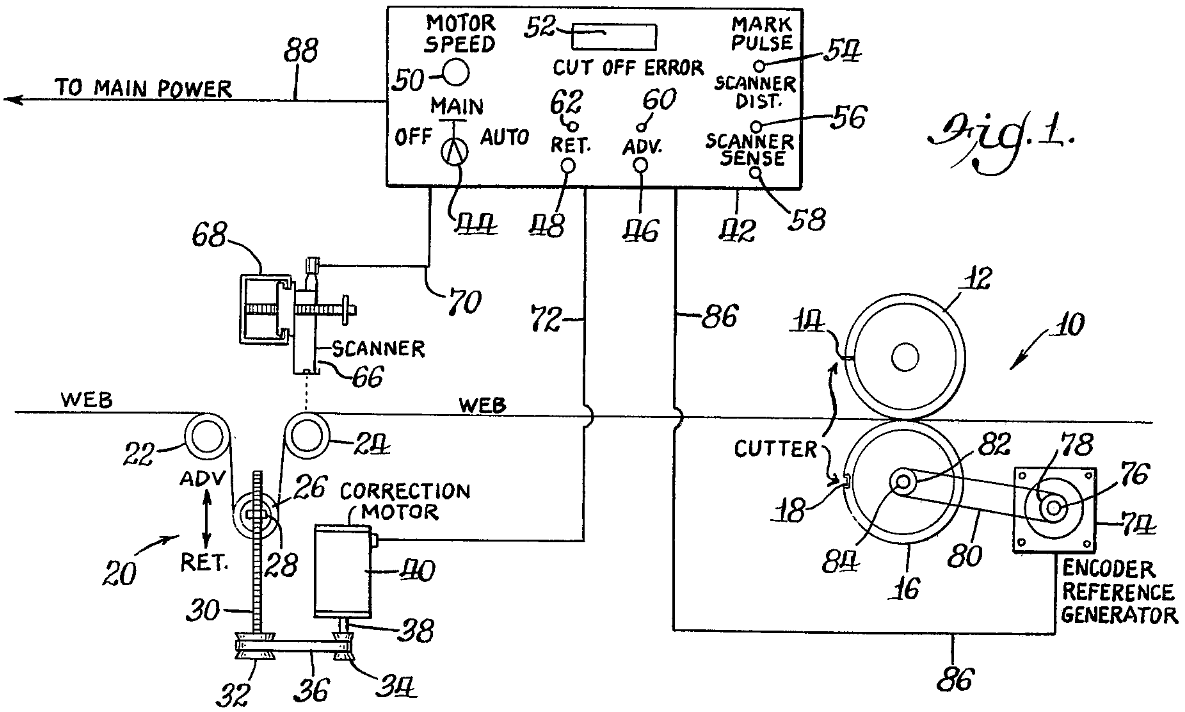
FIG. 1 is a diagrammatic illustration of a register control system shown in conjunction with a web operating apparatus and embodying the present invention.

Turning now to the drawings, and particularly FIG. 1, the control system embodying the present invention is shown together with a portion of a web operating apparatus which is specifically illustrated to have a web cutter and a position adjusting mechanism. While the control system described herein is in conjunction with a web operating apparatus that utilizes these components, it should be understood that the control system described herein is useful in other applications, such as color registration in a printing press that utilizes gravure where drying is needed between the printing of each color and in printing presses of the type where back up registration is needed.

More specifically, the web operating apparatus shown in FIG. 1 has a cutter mechanism, indicated generally at 10, which includes an upper roller 12 having a knife 14 and a lower roller 16 having an anvil 18 which cooperates with the knife 14 to make a transverse cut of the web for each rotation of the rollers 12 and 16. In this regard, the rollers 12 and 16 are driven in synchronism and are accordingly sized so that the transverse cuts are made on the web at each repeat length or signature as is desired. The web operating apparatus includes web adjusting equipment, indicated generally at 20, which includes rollers 22 and 24 which guide the web, the web passing around a third roller 26 that can be vertically adjusted to either advance or retard the position of the web that is presented to the cutter apparatus 10. The compensating roller 26 has its shaft journaled at opposite ends in members 28 which have a threaded aperture that is cooperatively connected to a threaded bolt 30 which can be rotated in opposite directions to raise or lower the member 28 and therefore the roller 26. The shaft 30 has a pulley 32 which is linked to a pulley 34 by belt 36, although it can be a chain or the like, with the pulley 34 being attached to the drive shaft 38 of a correction motor 40 which comprises part of the present invention.

The system of the present invention is shown to include a control panel 42 having an off-manual-automatic switch 44, advance and retard pushbuttons 46 and 48, a correction motor speed adjustment knob 50, a digital display 52, together with a mark pulse indicator 54, a scanner distance indicator 56, a scanner sensing indicator 58 and advance and retard indicators 60 and 62, respectively. A scanner 66 is positioned just above the web adjacent the roller 24 and is mounted by a structure indicated generally at 68 so that it can be vertically adjusted relative to the web for the purpose of optimizing the signals that are detected by it. The signals that are generated by the scanner are sent to the control panel via conductors 70, and similarly, lines 72 extend to the correction motor 40 for operating the same. The system includes an encoding reference generator 74 (hereinafter referred to as the shaft encoder or merely the encoder) that has an encoder shaft 76 with a pulley 78 that is operably connected to the lower roller 16 via belt 80 that is carried by pulley 82 on the shaft 84 of the roller 16. The size of the pulleys 84 and 78 are determined such that a 1:1 ratio of rotation is established, i.e., for each rotation of the roller 16, there will be a single rotation of the shaft 76 of the encoder 74. The output signals that are generated by the encoder 74 are sent to the control panel via lines 86 and power for the system is supplied to the control panel by lines 88. It should be noted that since the encoder shaft is essentially measuring very precise positions, the connection between the shafts 74 and 84 should be optimized and it is often preferred that they be directly coupled together.

With respect to the general operation of the system together with the web operating apparatus shown in the drawing, an operator will set the switch 44 in the manual setting which enables him to actuate either the advance or retard switches 46 and 48 which will cause the correction motor 40 to operate and either advance or retard the position of the web that is presented to the cutter and anvil so as to produce the cut at the desired location.

After the operator has made the proper adjustment to obtain the cut at the desired location with respect to the signature or successive repeat lengths of the web, he can switch the switch 44 to the automatic setting and it will automatically maintain the registered condition during operation provided the web does not physically slip a large distance relative to the rollers 12 and 16. In the event of the latter occurring, the system also offers the capability of incrementally advancing or retarding the web during automatic operation and this can be done by merely depressing either the advance or retard pushbuttons 46 and 48, with the amount of movement being determined by the duration of depressing of the appropriate pushbutton by the operator, with the web moving very small amounts, i.e., about 3/1000 inch per ¼ second in an apparatus where the repeat length of the web is about 23 inches for example. When the system is being set up in manual mode, the indicator 58 provides an indication that the scanner is sensing dark marks or indicia on the web and the indicator 54 provides an indication that mark signals are being produced, it being understood that the dark marks that are detected by the scanner must be processed and must satisfy certain requirements regarding isolation from one another and minimum distance of light area before the dark mark in order to produce a valid mark signal. After the operator has determined that one or more valid mark signals are being generated, he can then switch to automatic operation and the system will thereafter operate automatically to maintain the register condition.

When the system is operating in the automatic mode, a digital display 52 will provide an indication as to the amount of error that is present, it being appreciated that when the web is moving very rapidly and has shifted so that the signature has moved relative to the cutter apparatus 10, several cuts may occur before the adjusting mechanism 20 can regain the register condition and the digital display 52 indicates its progress and whether an error is present.

With respect to the more detailed operation of the system, reference is made to FIG. 2 which illustrates a block diagram of the circuitry that is incorporated in the system which carries out the operation that has been broadly described. The scanner detects a change in contrast through the use of a light source which is directed toward the web and a light sensitive photo-transistor which detects the reflected light from the web and provides a signal to contrast detection and shaping circuitry 92 which processed the signal by shifting its D.C. level and provides an output signal that has sufficient voltage magnitude. In this regard, the circuitry effectively measures changes in contrast from a light level as would be provided by an unprinted web, for exmaple, and measures a change in contrast from the light level to a dark level which would occur due to the presence of a dark line or other indicia that is printed on the web. The change in contrast can be gradual or abrupt and an abrupt change in intensity produces a signal that is of greater amplitude and the circuitry 92 is effective to ignore changes in contrast that are not sharp and distinct.

The output signals resulting from the more desirable contrast changes are then effectively reclocked to be synchronized with encoder pulses and are sent to mark isolation circuitry 94 which generates a mark signal whenever the output signals from the contrast detection and shaping circuitry meet certain prequalifications. The qualifications are that the output signal must be sufficiently isolated in terms of web distance in the direction of web travel from a preceding output signal, coupled with the requirement that there be a minimum distance of lightness before the contrast change which resulted in the output signal. If these two prequalifications exist, then a mark signal is generated and is sent to a counter 96 as well as to timing error detection circuitry 98. It should be understood that within each repeat length or signature of a web, there may be one or more mark signals that are generated and they may occur at various locations within the signature. However, once they satisfy the prequalification, they will be produced and it is unimportant that several may be produced during each repeat length, for the reason that only one is thereafter used during automatic operation. When the switch 44 is switched from the manual to automatic mode of operation, the next occurring mark signal from the circuitry 94 will be used and by virtue of a window being set up in the timing error detection circuitry 98, that mark signal occurring during each repeat length will be used. By virtue of having satisfied the prequalifications, adjustment of the web within acceptable levels of error correction will set up the necessary distance isolation between an adjacent mark signal and will not result in the system using an incorrect mark signal other than the one originally used after the system has switched to automatic mode.

The encoder 74 is of the type which produces an output that comprises two 1800 cycle phase related square waves per revolution of its shaft which are applied to direction logic and multiplier circuitry 100 that produces 7200 pulses per revolution together with a direction of rotation signal and the pulse train is applied to pulse adding and subtracting circuitry 102, which can selectively add or subtract pulses from the pulse train in response to the operator depressing the appropriate pushbutton 46 and 48 after the system is in automatic operation. The resulting pulse train is applied to increment or decrement a counter 96. Since the encoder produces an output signal that provides an indication as to which direction its shaft is being rotated which is detected by the circuitry 100 and this indication is provided to the counter 96 which maintains a running count of the pulses that are presented to it, the ability of the counter to be incremented or decremented is important to maintain a precise indication of the shaft position, it being understood that if the web operating apparatus is stopped, there will necessarily be so rocking in the gears of the rollers 12 and 16. It is also important that the counter know the direction in which the encoder 76 shaft is rotating, in addition to the pulses itself, to maintain proper operation, because its terminal count is what is effectively used in a comparison with the occurrence of the mark signal. Thus, when the web is moving in the forward direction, the counter 96 will be incremented and when it is moving in the reverse direction, the encoder shaft 76 will rotate in the opposite direction and the counter will be decremented by the number of pulses that are generated by the movement of the shaft in the reverse direction.

In accordance with an important aspect of the present invention, the counter 96 has a terminal count that corresponds with the total number of pulses that are generated by the multiplier circuitry 100 during a complete, single revolution of the shaft of the encoder 74. Thus, in the preferred embodiment described herein, the counter has a terminal count of 7200 which corresponds to the number of pulses that are produced by the pulse multiplier 100 during a complete revolution of the reference pulse generator 74. The counter 96 resets itself when it reaches its terminal count of 7200 and is initially enabled to run at the occurrence of the first mark signal from the mark isolation circuitry 94 subsequently of the system being switched from manual to automatic mode. Thus, after the system has been set up in a manner whereby a register condition is obtained and the operator switches the switch 44 to automatic mode, the first mark pulse that is generated will enable the counter 96 and after a complete revolution, the mark signal should again be received at the same time the counter 96 reaches its terminal count.

If there is a difference between the occurrence of the mark signal and the terminal count, that difference indicates an error condition or deviation from the desired register condition. The output of the counter 96 is applied to the timing error detection circuitry 98, together with the mark signal and any errors are detected. The circuitry essentially measures the difference between the occurrence of the terminal count and the mark signal and generates pulses that are proportional to the amount of the difference which are received and counted in an error counter 104 which in turn is connected to the display 52 for displaying the count and to an error down-counter 108 which is clocked by an adjustable frequency clock 110 that is controlled by the error detection circuitry 98. The error detection circuitry 98 also detects whether the mark signal occurs before or after the occurrence of the terminal count and selectively energizes either logic control circuitry 112 or 114 which are respectively connected to drive circuitry 116 and 118 for driving the correction motor 40 in the proper direction. A zero crossing control 120 is provided to insure that the A.C. stepping correction motor 40 is energized at a zero crossing point and the error down counter also effectively turns off the energization of the correction motor when the error count is reduced to zero.

Figure 6A:
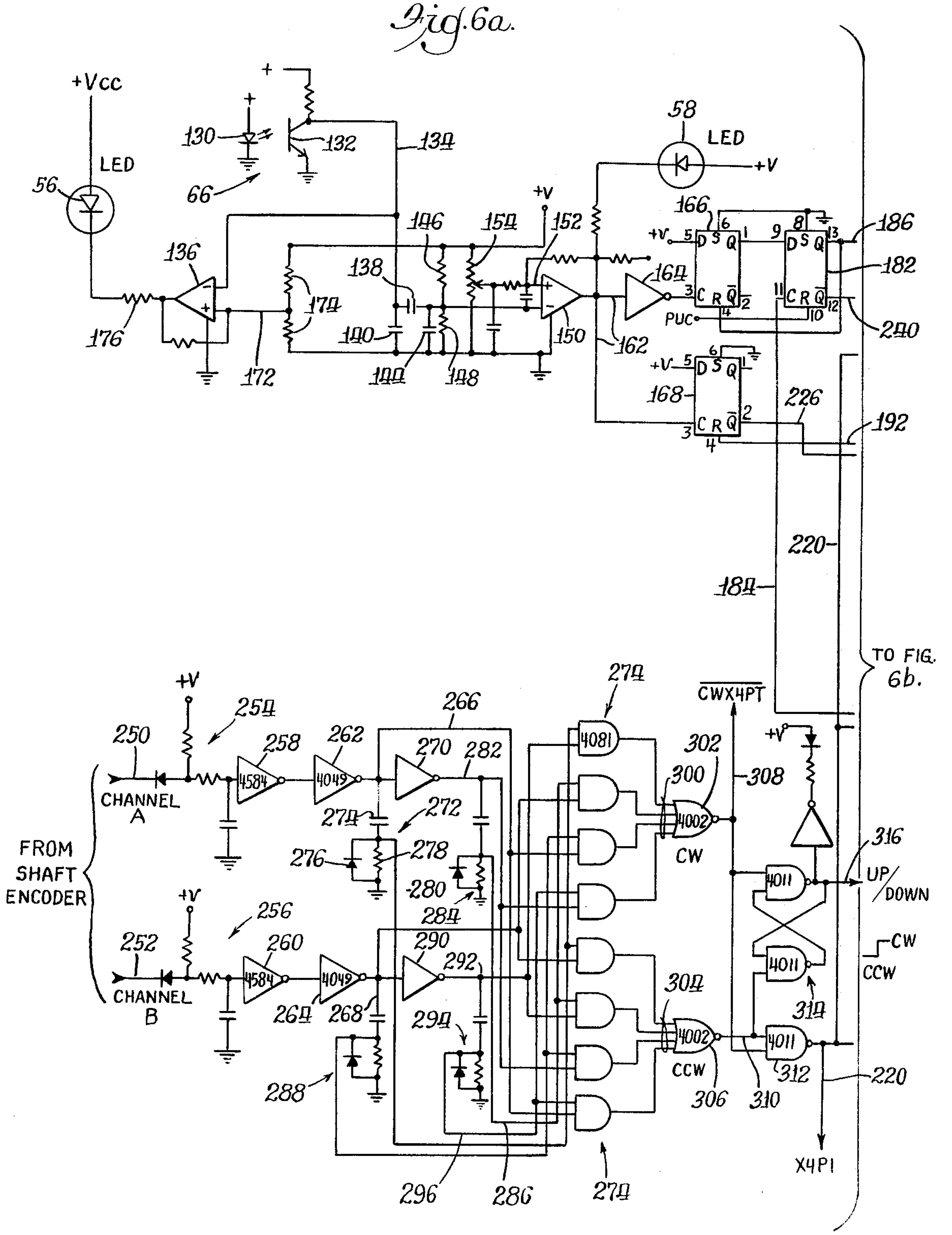
Figure 6B:
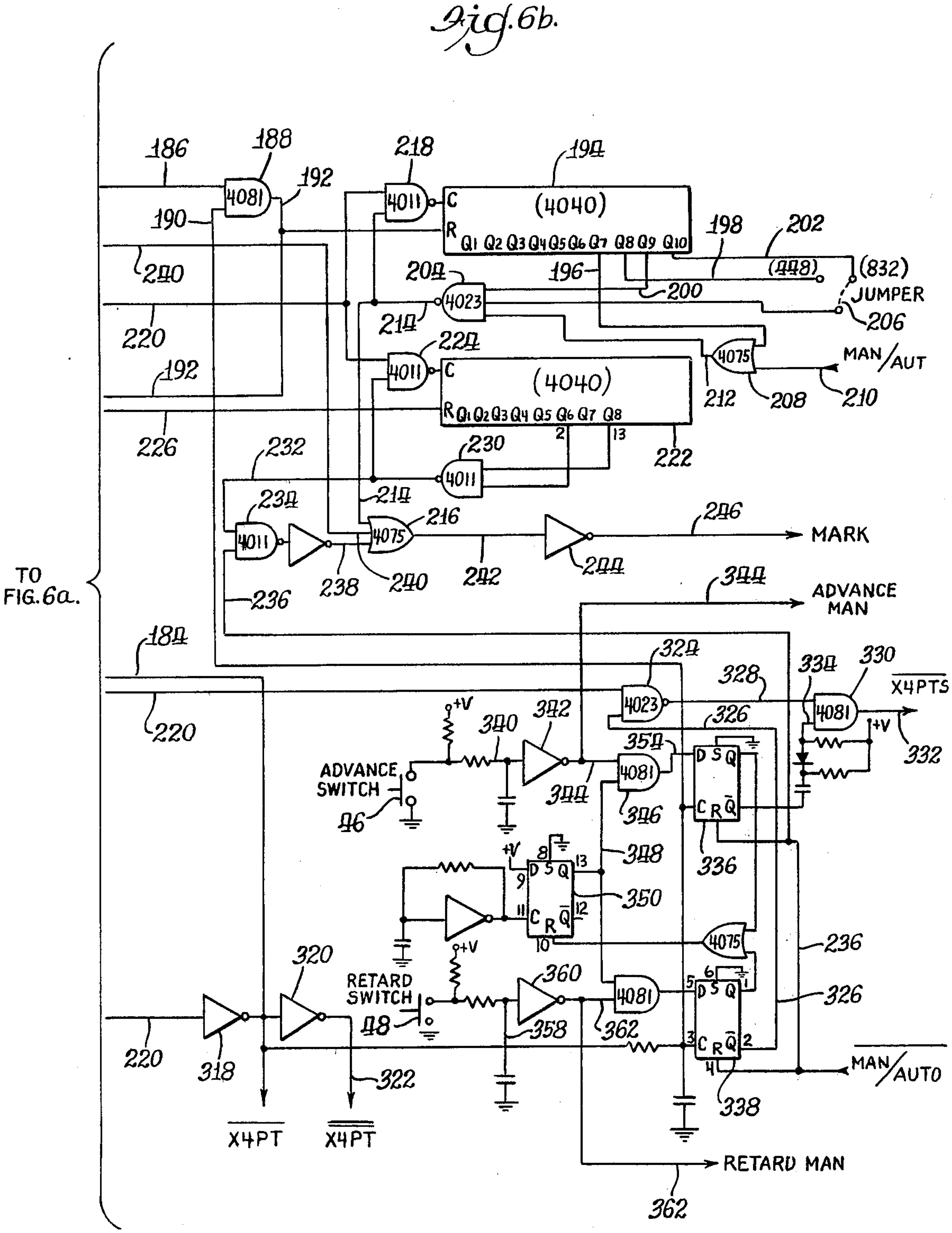

Turning now to the detailed electrical schematic circuit diagrams which can be used to carry out the operation of the circuitry shown in the block diagram of FIG. 2, the circuitry that is used to generate the mark signals will initially be described in conjunction with FIGS. 6*a* and 6*b*. Referring initially to the upper portion of FIG. 6*a*, the scanner 66 is shown to comprise a light emitting diode 130 (although another kind of light source may be used) which is directed toward the web and a photo-transistor 132 is positioned to monitor the reflected light and is biased to switch off when a dark level is detected, it normally being switched on when light portions of the web are being monitored. Thus, when a transition from a light area to a dark line is encountered, the photo-transistor 132 switches off which produces a pulse at the collector which is applied by line 134 to a comparator 136 as well as to a coupling capacitor 138 and a high frequency bypass capacitor 140. The capacitor 138 is in turn connected to line 142 that is connected to another high frequency bypass capacitor 144 as well as to resistors 146 and 148 which comprise a voltage divider and effectively shift the D.C. level of the pulse that is generated on line 134 to a level that is preferably about 6 volts, considering that the +V supply voltage is preferably about 12 volts. Line 142 is also connected to one input of a comparator 150, the other input of which is supplied by line 152 that has a voltage level that can be adjusted by a potentiometer 154.

Figure 3:
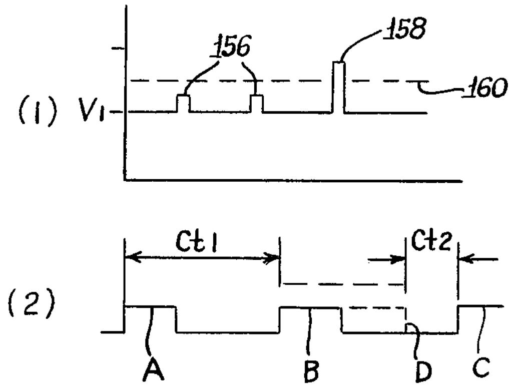
FIG. 3 illustrates two waveforms that will be used in describing the generation of the mark signals used in the system embodying the present invention.

Referring to FIG. 3(1) which is a waveform produced by this portion of the circuitry, the voltage level V1 is the level on line 142, and the pulses 156 and 158 represent the pulses that are generated by the phototransistor 132. The dotted line 160 represents the voltage level that can be adjusted vertically by adjusting of the potentiometer 154 so that the comparator 150 can essentially ignore smaller pulses such as pulses 156 and be operated by the larger pulse 158 which exceeds the level on the dotted line 160. When a pulse such as pulse 158 is applied to input line 142 to the comparator, it produces a low output signal on line 162 that is inverted by inverter 164 and applied to the clock input of a flip-flop 166. Line 162 is also applied to the clock input of a flip-flop 168 and from the foregoing, it should be appreciated that when line 162 is at a high level, the phototransistor is monitoring an area of light contrast on the light emitting diode. When the output of comparator 150 goes low, it indicates the presence of a dark line or indicia on the web which will potentially be a mark signal and in fact will be if it satisfies certain qualifications that have been broadly described and which will be hereinafter explained in detail. Line 162 is also connected to a resistor 170 which in turn is connected to a light emitting diode 58 which is located on the control panel 42 and which indicates to the operator that the scanner is sensing changes in contrast from light to dark.

The comparator 136 has the pulses from the phototransistor 132 applied to one input thereof via the line 134 and another input line 172 applies a voltage level from a voltage divider comprised of resistors 174. The output of the comparator 136 is connected through a resistor 176 to the light emitting diode 56 which provides the operator with a tool in which to position the scanner the optimum distance from the web. In this regard, if the scanner is placed too far from the web, there will be no contrast detected and if it is too close, it will be blind to contrast changes. The operation of the light emitting diode will thereby enable the operator to set the scanner a distance so as to obtain the optimum signal transfer and will typically be placed a distance approximately 1/16 inch from the web.

When a contrast change to dark occurs which causes the comparator 150 to produce a low output on line 162, the flip-flop 166 is set and its Q output line 180 will go high which is applied to the D input of a flip-flop 182, and which is clocked by a clock signal on line 184 that is provided by and therefore synchronized with the encoder 74. When the flip-flop 182 is clocked, its Q output line 186 will go high which will reset the flip-flop 166 so that upon the next clock pulse appearing on line 184, the level on line 186 will go low, thereby resulting in the production of a high signal on line 186 for only one clock cycle. The line 186 is connected to an AND gate 188, the other input of which is supplied by a clock pulse on line 190 from the encoder so that the AND gate 188 produces a high on line 192 for one clock cycle which is used to reset a binary counter 194 having output lines 196, 198, 200 and 202. When it is reset, all of the output lines are driven low. Line 192 is also applied to the reset terminal of the flip-flop 168 which enables its reset and which will be clocked at the occurrence of the next high signal that is generated on line 162 by the comparator 150.

The output lines 196, 198, 200 and 202 represent the binary outputs for numbers 64, 128, 256 and 512 and these lines are selectively applied to a NAND gate 204 in the following manner. Line 200 is shown to be directly connected to the gate 204 while lines 198 and 202 are extended to the right and a jumper 206 selects one or the other to provide a total count of either 448 or 832 being required to enable the gate 204. The line 196 is applied to a gate 208 which has an input line 210 which is low when the system is in the manual mode and high when it is in automatic mode. When the system is set up, it is placed in the manual mode and the gate 208 has an output on line 212 that is applied to the gate 204 and effectively adds 64 additional counts to the total before the gate 204 is satisfied. When the counter 194 therefore reaches its terminal count of 832 plus 64 with the jumper 206 positioned as shown, the output of gate 204 on line 214 will go low which will enable one input of an OR gate 216 and one input of a NAND gate 218. The gate 218 has its other input supplied by line 220 which supplies clock pulses from the encoder circuitry and which clocks the counter 194. When the output line 214 of the gate 204 goes low, the gate 218 is disabled and clock pulses are no longer applied to the counter 194 so that the counter is stopped at the count of 832 plus 64.

A second counter 222 is also provided and is clocked by the clock signal on line 220 via a NAND gate 224 and is reset by line 226 which is connected to the $\overline{Q}$ output of the flip-flop 168. Since the output of the comparator 150 clocks the flip-flop 168, and keeping in mind that the comparator output will be low for the duration of the darkness being sensed by the scanner, and will only go high when it again senses a light area of the web, the flip-flop 168 is controlled to reset the counter 222 when the light portion is again encountered or stated in other words, when the darkness terminates. Thus, counter 222 begins counting when a prior dark level expires and the counter output lines 228 are used to control a gate 230 which provides a low output on line 232 when the desired count (shown to be count 160) is reached which disables the gate 224 thereby stopping the clocking of the counter. The line 232 is also applied to a gate 234 which has another input supplied by line 236 from the manual/automatic mode signal which is high when it is in manual operation and low when it is in automatic operation. Since the system is placed in manual operation during set up, the input 236 will be high so that when the terminal count of the counter 222 is reached, gate 234 will be satisfied and will produce a low level on line 238 which satisfies another input of the gate 216. The third input line 240 is supplied by the $\overline{Q}$ signal from the flip-flop 182 which will be low at the next change to dark contrast signal operates the comparator 150 and is reclocked through the flip-flop 182 which will be passed through the gate 216 by virtue of the input lines 214 and 238 having been previously satisfied and will produce a low signal on line 242 that is inverted by inverter 244 to produce a mark signal on line 246.

The significance of the operation of the counters 194 and 222 is to insure proper isolation of mark signals that are produced on line 246 by requiring the contrast change from light to dark to be separated from preceding adajcent and similar changes and to require a minimum distance or amount of light area to occur in a direction of web travel before the change to dark occurs. Thus, referring to FIG. 3(2), there is shown three successive changes in contrast, A, B and C. Thus, the first possible mark A starts the counter 194 and it must achieve its required count before the occurrence of the second possible mark B or the second possible mark will not generated a valid mark signal on line 246. Similarly, the possible mark B is shown to expire well before the occurrence of the third possible mark C and there must be a period of lightness that is measured by counter 222. Thus, if the possible mark B would extend beyond the dotted line D so that the required count could not be achieved before the occurrence of the possible mark C, then the mark C would not produce a mark signal on output line 246.

Thus, the counter 194 requires a minimum spacing between adjacent marks and insures proper isolation so that an unambiguous mark signal will be generated and some minimum amount of movement of the web which could be caused by a slippage or the like will not result in a different mark signal being used after the system has been switched to the automatic mode of operation. The extra 64 counts that are inserted into the requirement of counter 194 are effectively removed when the apparatus is switched to the automatic mode of operation and the counter 222 is also effectively removed, since when it is switched in manual mode line 236 will be low and input 238 to the gate 216 will be enabled regardless of the output of the counter 222. The counter 222 provides protection which insures that the relatively slow response time of the scanner photo-transistor will not cause a mark signal to disappear when the web speed of the web operating apparatus is significantly increased. It should be appreciated that if the photo-transistor response time is slow and only a small area of lightness occurred between one dark mark and the next dark mark, the second mark could effectively disappear.

Figure 4:
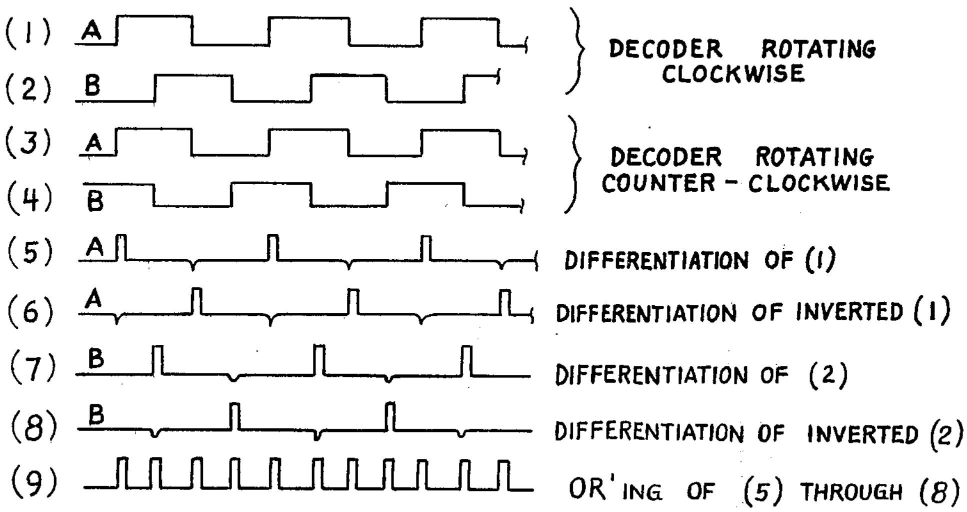
FIG. 4 illustrates a series of waveforms that will be used in describing the operation of the encoding reference generator of the system embodying the present invention.

In accordance with another important aspect of the present invention and referring to the lower portion of FIG. 6*a*, the circuitry that receives the signals from the encoder and provides the signal that indicates the direction of rotation of the shaft as well as multiplying the outputs to generate the 7200 pulses per revolution is shown to have inputs 250 and 252 which are obtained from a conventional shaft encoder of the type which generates a two channel 1800 cycle per revolution square wave wherein one channel is 90° out of phase with respect to the other. The encoder is of the type which does not produce an index pulse per revolution and may be a model number 700 series shaft encoder, specifically model number 702FS 1800-O-C-L-P-HTL-LD as manufactured by Disc Instrument Inc., 102 East Baker Street, Costa Mesa, California. The channel A output from the shaft encoder is applied to input line 250 and the channel B output is applied to input line 252. During rotation of the shaft of the encoder in the clockwise direction, the square wave output waveforms of the channels A and B are as shown in FIG. 4(1) and (2) whereas when the shaft of the encoder is rotated in the counterclockwise direction, the waveforms are as shown in FIG. 4(3) and (4). The square wave outputs appearing on input lines 250 and 252 are filtered by filters 254 and 256, respectively, to eliminate any ringing and the outputs of the filters are respectively applied to Schmidt triggers 258 and 260 which are in turn connected to respective buffers 262 and 264. The outputs of the buffers appear on lines 266 and 268. Line 266 extends to an inverter 270 as well as to a differentiator 272 which comprises a capacitor 274, a diode 276 and a resistor 278. A line 280 that is connected to each of the components of the differentiator 272 extends to the inputs of two of the AND gates in the group of AND gates 274. Similarly, the output of the inverter 270 appears on line 282 that is in turn connected to a differentiator 284 that has line 286 extending to selected inputs of two of the AND gates 274. The line 268 associated with channel B also is connected to a differentiator 288 and to an inverter 290 having an output line 292 that is connected to a differentiator 294 and to inputs of two AND gates 274 with the line 296 from the differentiator 294 also being applied to two of the AND gates.

The operation of each of the differentiators is identical and only the operation of differentiator 272 will be described. Essentially the differentiator 272 will produce a pulse for each positive transition of the square wave and its associated diode 276 will block the negative transition. This can be seen from viewing the square wave of channel A shown in FIG. 4(1) and its differentiated signal which appears on line 280 is shown in FIG. 4(5). Similarly, the inverted output which appears on line 282 is similarly processed to produce the pulses that are shown in FIG. 4(6). The net result of the differentiation and extension of the lines to the AND gates 274 is that the AND gates 274 will be appropriately enabled to provide output signals on the lines 300 which are applied to a gate 302 and via lines 304 to gate 306, such that when the encoder shaft is rotating in the clockwise direction, a pulse train of 7200 pulses per revolution is generated, the circuitry effectively multiplying the 1800 cycle output by four which appears on line 308. Similarly, when the encoder shaft is rotated in the counterclockwise direction, a pulse train of 7200 pulses per revolution is generated on line 310 and no output is produced on line 308. Lines 308 and 310 are applied to an NAND gate 312 which provides a 7200 pulses per revolution pulse train on line 220 which occurs when the encoder shaft is rotating in either the clockwise or counterclockwise direction and the lines 308 and 310 are also applied to a flip-flop 314 which has an output line 316 that is maintained high when it is rotating in the clockwise direction and is low when it is in the counterclockwise direction. Thus, the output of the circuitry produces the desired 7200 pulses per revolution in addition to a signal on line 316 which indiates the direction in which the shaft is rotating. The pulse train on line 220 is applied to an inverter 318 producing an inverted pulse train on line 184 which is also connected to an inverter 320 to produce still another inverted pulse train on line 322. The pulse train that appears on line 220 is applied to an NAND gate 324 which is effective to remove pulses therefrom, which will occur when the other input line 326 is low which occurs when the retard pushbutton switch 48 is depressed. If the switch 48 is not closed, then there will be a high level on line 326 and the pulse train on line 220 will be inverted and will appear on line 328 which extends to an AND gate 330. The output of the AND gate 330 appears on line 332 which is applied to the counter 96. The OR gate 330 is used to add pulses to the pulse train via input 334 in response to closing the advance switch 46.

The pulses can only be added or subtracted to the pulse train when the system is in the automatic mode during which time the line 236 is low. When in manual mode, line 236 is high and holds flip-flops 336 and 338 in their reset condition. The pulse adding and subtracting switches 46 and 48 are connected to circuitry which enables pulses to be added or subtracted at a uniform rate, preferably at about one pulse for each $\frac{1}{4}$ second. Thus, if the operator quickly depresses the appropriate pushbutton, then single pulses are added or subtracted from the pulse train. If the operator holds the appropriate pushbutton depressed, then pulses will be added or subtracted at the rate of four pulses per second. Referring to the advance switch 46, when it is closed, line 340 will go low which is inverted by an inverter 342 thereby producing a high signal on line 344 that is applied to one input of an AND gate 346. The other input of AND gate 346 is supplied by line 348 that is the Q output of a flip-flop 350 that is being clocked by an oscillator indicated generally at 352. When line 348 is enabled and the switch 46 is then closed, than AND gate 346 will provide a high level on line 354 which sets flip-flop 336 so that the clock pulse on line 236 derived from the pulse train (but slightly delayed relative to the pulses on line 220) results in a pulse being added via the AND gate 330 shortly after a pulse has occurred. The synchronization is needed to insure that inserted pulses are spaced from the regular pulses in the pulse train. When the retard switch 48 is depressed, a low is produced on line 358 which is inverted by inverter 360 to produce a high signal on line 362 that is applied to an AND gate 364, the other input of which is also supplied by line 346 and when both inputs are enabled, the flip-flop 346 is set, which has its $\overline{Q}$ output line 326 extending to the gate 324 which effectively blocks a pulse in the pulse train from passing through the gate. In this manner, pulses are subtracted from the pulse train. As previously alluded to, when the system is in manual mode, line 326 holds the flip-flops 336 and 338 reset, and in this mode, the depressing of the advance and retard switchees 46 and 48 result in high signals being produced on lines 344 and 362, respectively, which extend to the drive circuitry for initially setting up the register condition in the web operating apparatus.

Figure 7A:
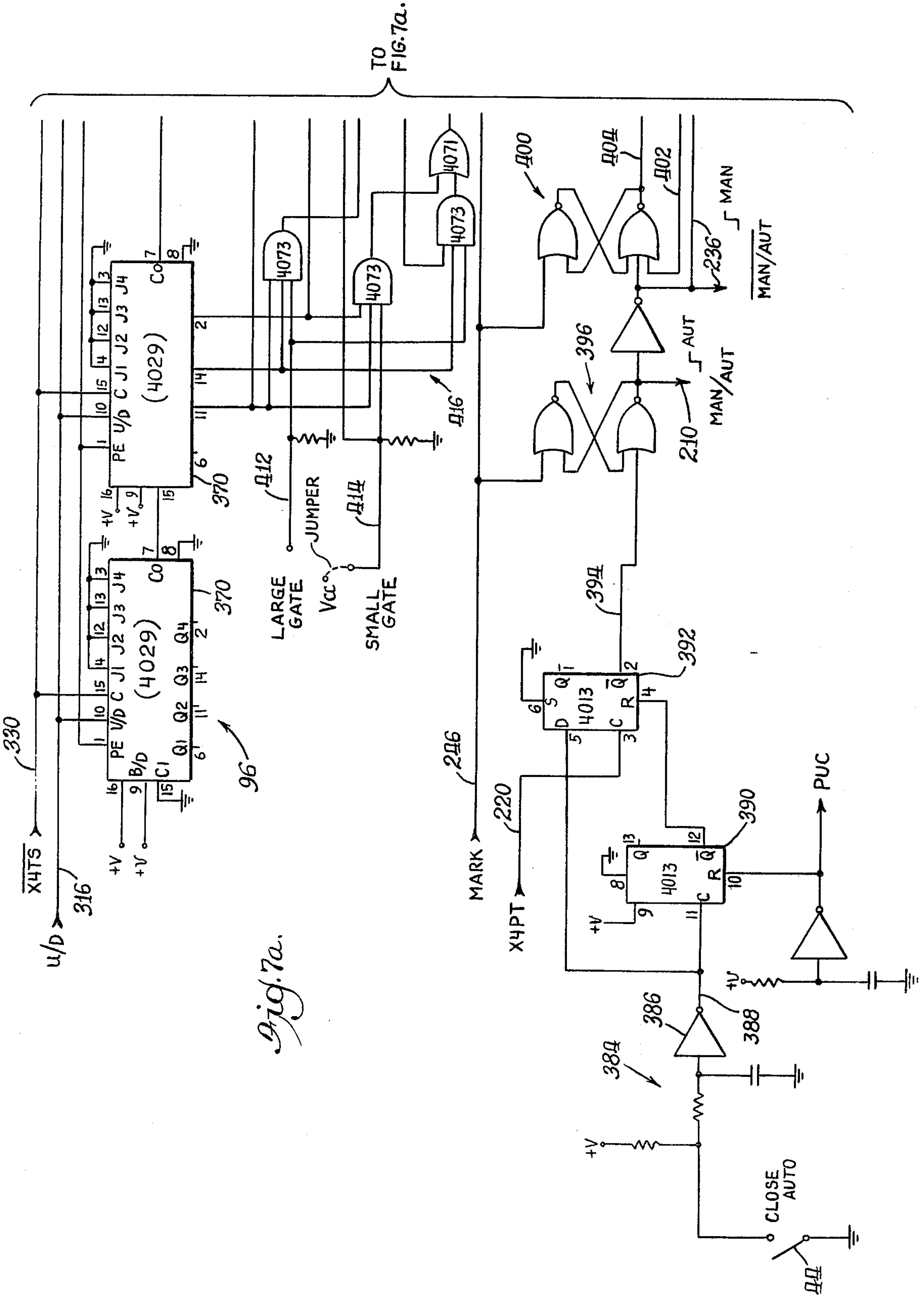
Figure 7B:
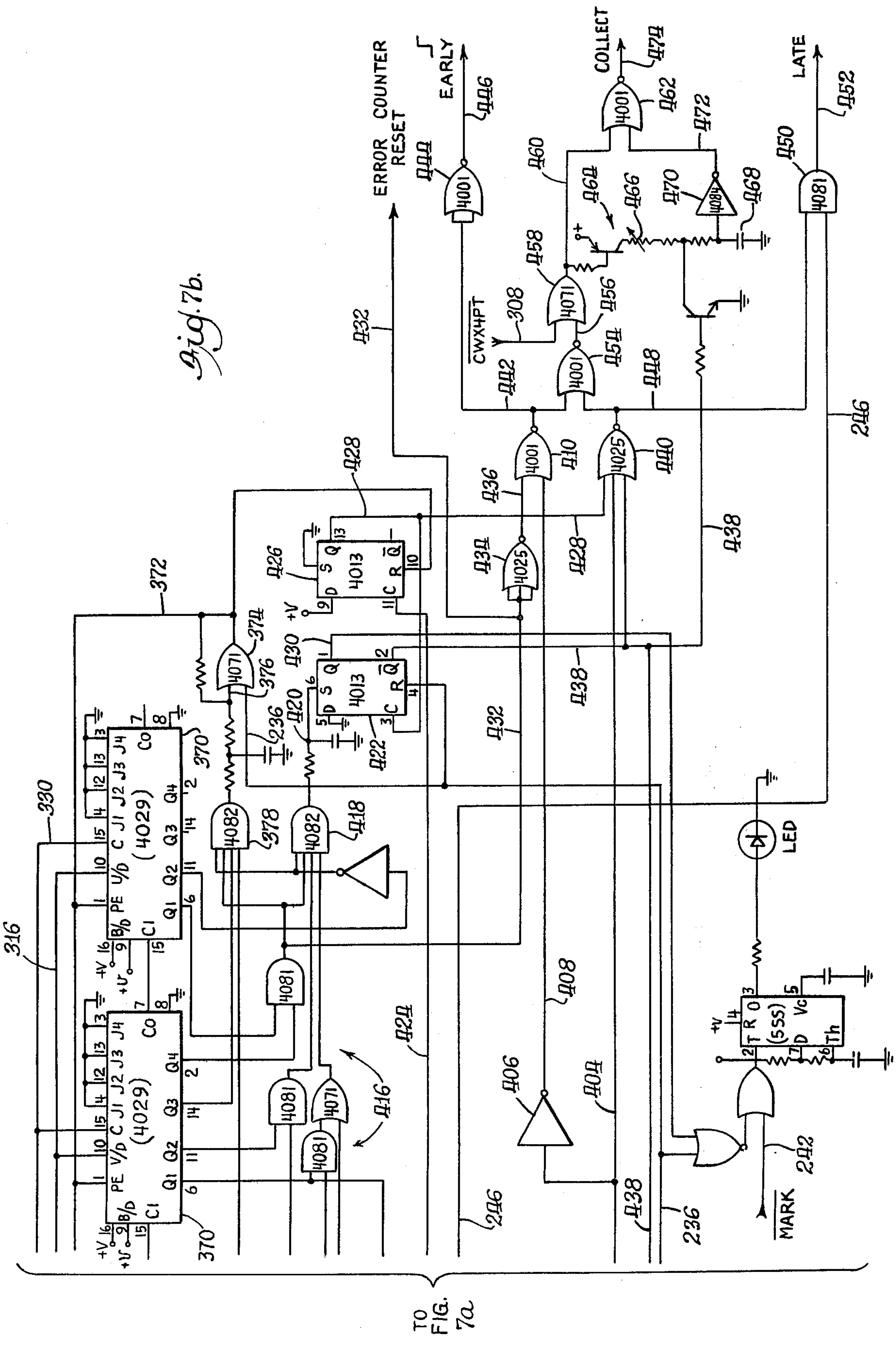

Turning now to the drawings containing the counter 96 and timing error detection circuitry 98, reference is made to FIGS. 7*a* and 7*b* which illustrate the counter 96 as comprising four cascaded binary counter integrated circuits 370 which are clocked by the encoder generated pulse train on line 330, together with the up-down, i.e., clockwise, counterclockwise signal that is asserted on line 316. A preset line 372 which is connected to all of the counter integrated circuits 370 effectively holds the counter at zero when it is high which is its condition until the system is switched to automatic mode whereupon the level is switched low permitting the counter 96 to operate. The line 372 is switched low by a gate 374 having both of its input lines 376 or 236 at a low level. Line 376 is connected to the output of an AND gate 378 that has input lines from the counter 96 and effectively generates a low output signal on line 376 except during the terminal count of 7200 which produces a high signal that is used to reset the counter at the terminal count. Line 236 goes low at the occurrence of the first mark signal that occurs after the switch 44 has been switched from manual to automatic mode.

Referring to FIG. 7*a*, the switch 44 is shown to be connected through a RC network indicated generally at 384 to an inverter 386 which provides a high signal on line 388 which sets a flip-flop 390 and the high signal is also supplied to the D input of a flip-flop 392 which is clocked by line 220 and thereby synchronizes the switching of the switch 44 to the pulse train. The $\overline{Q}$ output of flip-flop 392 on line 394 is connected to a flip-flop 396 that also has line 246 which carries the mark signal thereon. The flip-flop 392 holds the flip-flop 396 in reset condition when the switch 44 is in manual mode and when it is closed after switching to automatic, the reset condition by line 394 is removed which will allow the flip-flop 396 to change state at the occurrence of the next mark signal. Thus, when a mark signal is generated and appears on line 246, the flip-flop 396 will have output line 210 switched high and due to an inverter 398, line 236 will be switched low. Line 236 is connected to a flip-flop 400 as is line 246 carrying the mark pulse and as will be described, when the line 402 is low and a mark pulse is received, flip-flop 400 will produce a high signal on line 404 which is inverted by inverter 406 having output line 408 that goes low at a mark signal and is applied to a gate 410 associated with circuitry which determines whether the mark is early relative to the terminal count of the counter 96.

Figure 5:
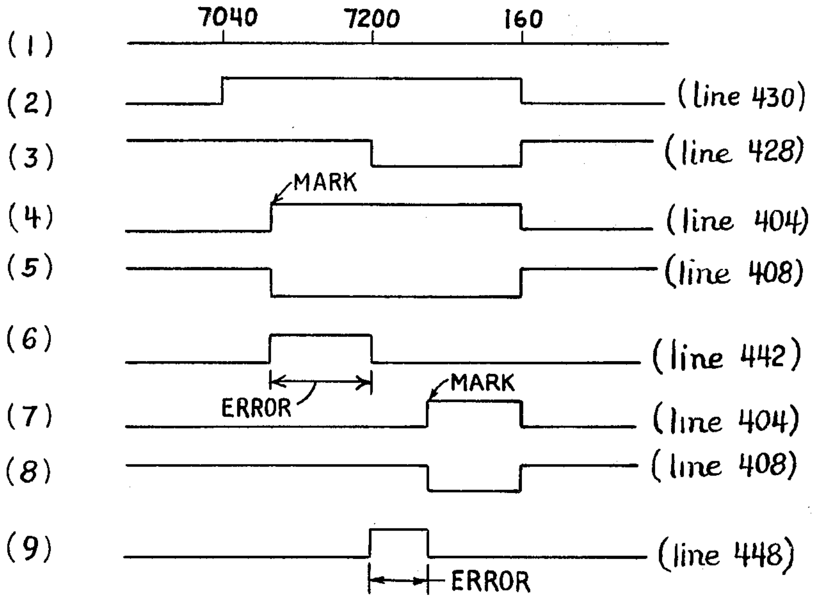
FIG. 5 illustrates a series of waveforms that are useful in describing the operation of the portion of the system which generate the error signals.

The lines 412 and 414 are provided for choosing as to whether a large window or smaller window are to be used, with line 414 being shown jumpered to a plus voltage and establishes a small gate of 320 counts in the illustrated embodiment. Line 414 is connected to logic circuitry shown generally at 416 which has inputs supplied by the output lines at the counter and which merely uses the appropriate counts to open and close the window during which the mark signal is required to occur. Thus, using the small gate window, the window is open 160 counts before the terminal count of 7200 and is closed at a count of 160 after it has been reset. The logic has lines that extend to gate 418 which has an output line 420 that sets a flip-flop 422 when the counter reaches a count of 7040 and a line 424 goes high at a count of 160 and this line is used to clock a second flip-flop 426 which effectively closes the window. Since the Q output line 428 of flip-flop 426 is connected to the clock input of flip-flop 422, when it is closed at the 160 count from the counter, it will clock the flip-flop 422 and its Q output line 428 will then be switched low. Since it had been switched high by line 420 which occurred at the count of 7040, the Q output line 430 of flip-flop 422 is high during the entire window and is low at all other times as shown by the waveforms of FIG. 5(2). Similarly, the waveform for the Q output line 428 of the flip-flop 426 shown in FIG. 5(3). As is evident, its Q output line 428 goes low at the terminal count and remains low until the close of the window at count 160. The logic circuitry 416 has a line 432 which goes high at a count of 6144 which is well before the window and this is used to provide a reset signal for the error counter that will be subsequently described herein and is applied to an inverter 434 having an output line 436 which goes high at the count of 6144 and switches low when the counter is reset to zero. The $\overline{Q}$ output line 438 of the flip-flop 422 is applied to a gate 440 together with lines 404 and 428 and this gate controls error detection circuitry and whether the mark occurs after the occurrence of the terminal count of 7200. The waveforms for the lines 404 and 408 are shown in FIG. 5(4) and (5) for the occurrence of a mark that is early relative to the 7200 terminal count and in FIG. 5(7) and (8) for the same respective lines when the mark occurs late or after the terminal count of 7200. If the mark signal occurs before or after the occurrence of the terminal count, that indicates an error is present and the size of the error for the early mark is shown in FIG. 5(6) and for a late occurring mark in FIG. 5(9).

When the mark pulse occurs early relative to the 7200 count, line 436 will be low until the terminal count is reached so it is enabled and the occurrence of a mark signal will cause line 408 to go low which will enable the gate 410 and provide a high on line 442. Once the terminal count of 7200 has been reached, then the line 436 will be switched high causing line 442 to go low which is inverted by inverter 444 to produce a high pulse on line 446 indicating that the mark has occurred early or before the 7200 count. The occurrence of the mark after terminal count will not result in an output from the gate 410 and no pulse will be produced on line 446. In the event the mark pulse occurs after the terminal count, line 428 will be low during the count of zero through 160 of the counter and line 438 will be low during the entire window and is thereby enabled so that when a mark occurs, line 404 which is low after zero occurs and which goes high at the mark signal and will enable the gate 440 to provide a high signal on line 448 which is applied to the AND gate 450 which has as its other input the mark signal itself via line 246 and produces a high signal on line 452 when the mark has occurred after the terminal count of 7200.

Lines 442 and 448 are also connected to a NOR gate 454 which has an output line 456 connected to an AND gate 458 having another input supplied by the pulse train from line 308 so that whenever an error occurs either early or late, gate 454 will enable gate 458 so that the pulses on line 308 will be gated to line 460 which are applied to gate 462. The circuitry indicated generally at 464, which includes a variable resistor 466, is effective to have the pulses charge a capacitor 468 which, when it has acquired a sufficient charge will switch inverter 470 and its output line 472 enables the gate 462 so that the number of pulses that are proportional to the error are gated through to line 474. The circuitry 464 effectively generates a deadband of a few pulses so that only errors that may be greater than a few pulses, e.g., three or four, will be gated to the error correcting signal as desired. The variable resistor 466 can be adjusted to increase the deadband or to eliminate it completely and thereby gate even a single error pulse which would indicate that the mark signal occurred within one count of the terminal count on the counter.

The circuitry that receives the detected error signals and processes them to control the drive circuitry for the correction motor is shown in detail in FIG. 8 and has the early and late indications being applied to respective latches 480 and 482 which have their Q output lines 484 and 486 which are respectively connected to the D input of flip-flops 488 and 490. When these flip-flops are clocked by line 492, their respective $\overline{Q}$ output lines 494 and 496, which extend to NOR gates 498 and 500, apply the retard and advance energization signals on lines 502 and 504, respectively. Since only an early or a late indication signal will be applied at one time, a signal on either line 502 or 504 to make the proper correction. During initial set up in manual mode, line 236 applies a high to gates 506 and 508 so that the lines 344 and 362 can be energized to produce signals on lines 502 and 504 to manually control the operation of the correction motor to initially acquire the register condition. When the switch 44 is moved to the automatic mode, AND gates 506 and 508 are disabled as desired. Similarly, line 236 is applied to gates 510 and 512 which hold the flip-flops 480, 482, 488 and 490 reset when it is in the manual mode and which remove the reset when the switch 44 is switched to automatic mode.

When either a late or early pulse is applied to the appropriate flip-flop and is presented to either the flip-flop 488 and 490, it is clocked by line 518 which is generated by the zero crossing detector circuitry 120 and a flip-flop 520. When the alternating current voltage goes through a zero, a trigger pulse is applied to the clock input of the flip-flop 520 and, by virtue of either a late or an early pulse being applied to one of the flip-flops 480 or 482, the $\overline{Q}$ output will be gated through OR gate 522 which has an output on line 524 which is inverted by inverter 526 having an output line 528 which removes the reset of the flip-flop 520. Thus, after an early or late error signal is presented, the next zero crossing will clock the flip-flop 520 and will cause its output line 518 to trigger the appropriate flip-flop 488 or 490 and result in the correction signal being produced on either line 502 or 504.

The error pulses that were generated on line 474 are applied to the error counter 104 which is reset by line 432 which occurs a substantial amount of time before the window during which the errors are counted, i.e., the count of 6144. The output of the error counter 104 appears on line 530 which extend to the error down counter 108 as well as to a display decoder 532. The Q output line 534 of the flip-flop 520 is used to preset the error down counter 108 in addition to loading the display 532.

An important aspect of the operation of the circuitry is that the occurrence of the early or late error pulse on line 446 or 452 occurs after the magnitude of the error has been determined, i.e., the pulses that are produced on 432 reflect the amount of error and the total count is acquired before the occurrence of the early or late error indication. Since the occurrence of the pulse on either line 446 or 452 effectively removes the preset to the flip-flop 520 so that the next zero crossing will clock it, the line 534 loads the accumulated count that is present on lines 530 of the error counter 104 into the error down counter 108. Also, both lines 494 and 496 of the early and late flip-flops is connected to an OR gate 536 which has output lines 538 that removes a reset on an adjustable frequency clock that produces clock pulses on line 540 that are used to clock the down counter to decrement the same. When the down counter is being decremented which indicates that the correction motor is being energized so as to make the appropriate correction, it will run until it reaches zero count in which event its output line 544 is forced low which is applied to an NAND gate 546 having an output line 548 that applies a signal to gate 512 which results in the flip-flops 488 or 490 being reset which removes the energization signal on line 502 or 504. A RC network 550 is used to insure that a number of complete sine waves are applied to the correction motor which is an A.C. stepping motor. The adjustable frequency clock 110 has a potentiometer 552 that can be adjusted to correlate the frequency of the clock signal on line 540 so that the correction motor is operated for a sufficient amount of time per error count, which will vary depending on the web adjusting apparatus that is being used. In other words, each clock signal may correspond to from 10 to 20 milliseconds of running time of the correction motor. If the correction motor is still running to try to correct for an error, and another error indication is generated, the circuitry stops the correction in the middle of the operation of the motor and this occurs by the new indication on line 446 or 442 removing the reset to the flip-flop 520 and the signal will be applied on line 534 which extends through inverter 554 and line 556, through the gate 546, line 548, gate 512 and resets the flip-flops 488 and 490.

Turning now to the drive circuitry for the stepping motor which is controlled by the signals on lines 502 and 504, and referring to FIG. 9, it will not be described in detail since it is of conventional design and is well known. However, line 504 is shown to be connected to a transistor 560 which, when a signal is applied to line 504 is switched on, which causes current flow in a light emitting diode 562 that is optically coupled to a phototransistor 564. When transistor 564 is switched on, it in turn switches on transistor 566 which will cause gate current to be applied via line 568 and triggers a triac 570 which is applied to the motor coils and produces rotation in one direction. A RC phase shift network 572 causes the motor voltage in coil 574 to lag that in coil 576. Similarly, if the motor is to be operated in the opposite direction, a signal applied to line 502 will turn on transistor 580, causing current flow in a light emitting diode 582 which is optically coupled to a phototransistor 584 which in turn will switch on a transistor 586 producing gate current in line 588 that triggers the triac 590 and causes line current to be applied to the motor with the voltage in coil 576 lagging that in coil 574.

From the foregoing description it should be appreciated that a register control system and method has been described which offers many significant advantages over prior art systems in terms of its simplicity of design and ease of operation. The system enables a register condition to be set up while it is placed in the manual mode and once the registered condition is obtained, the operator needs merely to switch the switch to automatic mode of operation and the system thereafter operates automatically. In the event that the web slips due to tension conditions that are produced by the web operating apparatus, the operator can manipulate pushbuttons to bring the web back into the proper register condition, but for normal running conditions, the system is operable to automatically perform this function.

Although particular embodiments of the present invention have been illustrated and described, various modifications, substitutions and alternatives will be apparent to those skilled in the art and, accordingly, the scope of the invention should only be defined by the appended claims and equivalents thereof.

Various features of the invention are set forth in the following claims.

What is claimed is:

1. A method of acquiring and maintaining a register condition for successive repeat lengths of a web that is acted on by work applying means of a web operating apparatus which also has adjusting means that can advance or retard the position of said repeat lengths relative to said work applying means, comprising the steps of:

scanning the web and producing a mark signal that corresponds to the occurrence of a distinctive contrast change on each repeat length of the web;

producing pulses during rotation in either direction of a shaft that is operatively connected to said work applying means, including producing a first predetermined number of pulses for each revolution of the shaft in a single direction;

producing a direction signal indicating the direction of rotation of the shaft;

employing a counting means for maintaining a running count of the net number of pulses that are produced wherein the count increases when the shaft is rotating in a direction corresponding to the web moving forwardly and decreases when the shaft is rotating in the opposite direction and producing a terminal count when said first predetermined number is reached;

measuring any difference between the occurrences of the mark signal and the terminal count and producing an error signal corresponding to the difference;

driving said adjusting means to selectively advance or retard the position of said repeat lengths in response to said error signal, the driving being effective to reduce the error signal.

2. A method as defined in claim 1 wherein said error signal indicates the magnitude of the error and whether the mark signal arrived before or after said terminal count was reached.

3. A method as defined in claim 1 including the step of generating a window that extends for a second predetermined number of counts before and after said first predetermined number of counts and disregarding any mark signals that are produced outside of the window.

4. A method as defined in claim 1 wherein said first predetermined number is 7200.

5. A method as defined in claim 3 wherein said second predetermined number is less than about 5% of said first predetermined number.

6. A method as defined in claim 1 wherein the first occurrence of a mark signal that is generated after said adjusting means has been set during start-up of the web operating apparatus starts the counting means.

7. A method as defined in claim 2 wherein said step of driving said adjusting means further comprises energizing an A.C. stepping motor in a first direction when said mark signal arrived before said terminal count was reached and in a second direction when said mark signal arrived after said terminal count was reached, the energization occurring for a time that varies in direction proportion to the magnitude of the error signal.

8. A control system for controlling a web operating apparatus of the type which has work applying means which acts on the web at a predetermined location within each of successive repeat lengths of the web during movement of the web and which has upstream adjusting means which are operable to advance or retard the position of the predetermined web location of the repeat lengths relative to the work applying means, said system acquiring and maintaining a register condition between successive repeat lengths at said work applying means, said system comprising:

first switching means for switching said system between manual and automatic modes of operation;

drive means for driving said adjusting means to advance or retard the predetermined web location to acquire a register condition while in manual mode and to maintain said register condition while in automatic mode;

second switching means operatively connected to said drive means and effective to energize said drive means so as to selectively drive said adjusting means in one of two possible directions while in manual mode;

sensing means positioned adjacent the web for generating mark signals in response to detecting changes from light to dark contrast on each repeat length of the web that is spaced a predetermined distance from a similar change in contrast and has a uniform light contrast for a second predetermined distance before said contrast change;

encoder means operatively connected to said work applying means and having a rotatable shaft that is connected to the work applying means so as to make one revolution per repeat length of the web, said encoder means providing pulses when said shaft rotates in either rotational direction and providing a directional signal indicating the instantaneous direction of shaft rotation, said encoder means providing a predetermined number of pulses per revolution of said shaft in one direction;

counting means for receiving said pulses and said directional signal and for maintaining a net running count of said pulses, said counting means having a predetermined terminal count of said predetermined number and resetting itself when it reaches the same;

means for measuring the difference between the occurrence of said mark signal and said terminal count and producing an error signal corresponding to the difference and applying said error signal to said drive means to reacquire said register condition;

said first switching means being operatively connected to said counting means and enabling the same to begin counting at the first occurrence of a mark signal after switching to automatic mode.

9. A control system as defined in claim 8 wherein said sensing means comprises:

means for detecting changes in contrast on the web surface and providing a contrast output signal in response to a change from light to dark indicia being detected;

means receiving said contrast output signals for generating said mark signals, said mark signal generating means providing one of said mark signals only when a first predetermined distance in the direction of web travel exists from the immediately preceding contrast output signal and when a distance of uniform light contrast exists before said contrast output signal.

10. A system as defined in claim 9 wherein said first and second predetermined distances are the equivalent of first and second predetermined counts of pulses of said encoder means.

11. A system as defined in claim 9 wherein said detecting means provides said contrast output signals that have amplitudes that vary in direct proportion to the sharpness of the contrast change, said sensing means including means for comparing the contrast output signals with an adjustable amplitude value and providing contrast output signal receiving means which exceed said adjustable amplitude value.

12. A system as defined in claim 10 including means for excluding mark signals from being applied to said difference measuring means that are not received within a third predetermined number of counts of said terminal count.

13. A system as defined in claim 12 wherein said first predetermined count is at least about 50% greater than said second predetermined count.

14. A system as defined in claim 12 wherein said difference measuring means provides an error signal that includes a magnitude of error component and a direction of error component that indicates whether the mark signal arrived before or after said terminal count, said difference measuring means includes error counter means for providing an error count indicating the magnitude of error that is proportional to the time difference between the occurrence of the mark signal and said terminal count of the counting means, said counter being clocked by the pulses from said encoder after being started by the occurrence of the first of said mark signal and said terminal count of said counter means and stopped by the last of the two, provided said mark signal occurs within said third predetermined number of counts of said terminal count.

15. A system as defined in claim 14 including means connected between said difference measuring means and said drive means for blocking error signal error counts less than a fourth predetermined count from being applied to said drive means to thereby create a deadband in which adjustment is not carried out.

16. A system as defined in claim 14 wherein said second switching means is adapted to selectively add counts to and subtract counts from the total error count in response to selective actuation of the second switching means when said first switching means is switched in automatic mode.

17. A system as defined in claim 16 wherein the number of counts that are added or subtracted by said second switching means varies in direct proportion to the length of time the second switching means is activated.

18. A system as defined in claim 16 wherein said second switching means includes a first switch for adding counts and a second switch for subtracting counts.

19. A system as defined in claim 8 wherein said drive means comprises an A.C. stepping motor having an output shaft operably connected to said adjusting means, said stepping motor being operable to drive the shaft in either rotational direction, rotation in one direction effecting advancement of the web and rotation in the opposite direction effecting retardation of the web.

20. A control system for controlling a web operating apparatus of the type which has work applying means which acts on the web at a predetermined location within each of successive repeat lengths of the web during movement of the web and which has upstream adjusting means which are operable to advance or retard the position of the predetermined web location of the repeat lengths relative to the work applying means, said system acquiring and maintaining a register condition between successive repeat lengths at said work applying means, said system comprising:

drive means operatively connected to the adjusting means for driving the same to selectively advance or retard the position of said web repeat lengths relative to said work applying means;

sensing means for detecting one or more changes in contrast on the web which occur at each repeat length and generating a signal when a distinctive change occurs;

means connected to receive the signals from said sensing means for generating one or more mark signals at each repeat length that corresponds to a distinctive contrast change on the web which is spaced in the direction of web movement a predetermined amount from other similar contrast changes and which also has a predetermined amount of uniform contrast before the change in contrast;

encoder means having a rotatable shaft operatively connected with said work applying means and generating a predetermined number of pulses per revolution of said shaft, said encoder means providing said pulses when said shaft is rotating in either direction and providing an indication signal as to the instantaneous direction of rotation, said predetermined number of pulses in one rotational direction corresponding to the movement of the web a distance equal to the repeat length of the web;

counter means connected to said encoder means for receiving said pulses and said indication signal of the direction of rotation, said counter means automatically resetting when it reaches its terminal count, said terminal count corresponding to said predetermined number of pulses;

means for detecting the occurrence of said mark signal relative to the occurrence of the terminal count of said counter means and generating a correction signal that indicates the direction and magnitude of any error in the register condition, said correction signal being applied to said drive means for driving said adjusting means in the proper direction to reacquire said register condition.

* * * * *

UNITED STATES PATENT AND TRADEMARK OFFICE
CERTIFICATE OF CORRECTION

PATENT NO. : 4,243,925

DATED : January 6, 1981

INVENTOR(S) : Herman C. Gnuechtel

It is certified that error appears in the above—identified patent and that said Letters Patent is hereby corrected as shown below:

Column 5, line 61, "exmaple" should read -- example --.

Column 10, line 9, "generated" should read -- generate --.

Column 10, line 53, "1800-O-C-L-P-HTL" should read -- 1800-O-C-L-HTL --.

Column 12, line 17, "than" should read -- then --.

Column 12, line 36, "switchees" should read -- switches --.

Column 13, line 39, "closed" should read -- clocked --.

Signed and Sealed this

*Twenty-seventh* Day of *October 1981*

[SEAL]

*Attest:*

GERALD J. MOSSINGHOFF

*Attesting Officer* *Commissioner of Patents and Trademarks*